Nov. 9, 1937.   M. FREI   2,098,723
RAIL GUIDED VEHICLE
Filed Sept. 17, 1935

Inventor:
Max Frei,
By Sommers & Young.
Attys

Patented Nov. 9, 1937

2,098,723

UNITED STATES PATENT OFFICE 2,098,723

RAIL-GUIDED VEHICLE

Max Frei, Neuhausen, Switzerland, assignor to firm Schweizerische Industrie-Gesellschaft, Neuhausen, Switzerland Application September 17, 1935, Serial No. 40,983
In Switzerland September 26, 1934

10 Claims. (Cl. 105—168)

The present invention relates to improvements in rail guided vehicles and particularly to rail-guided vehicles having at least one group of axles consisting of two axles. Rail guided vehicles are already known comprising two bogies each containing a group of two axles, each bogie being linked to the frame carrying the vehicle body and the two bogies being connected to each other in such a manner that the axles are angularly adjusted to the curves. Vehicles having supporting frames on which the vehicle body is supported at central points, the bogies each having a pair of axles and each axle having an axle frame pivotally supporting its axles, and the axle frames being articulately connected together and angularly controlled by the position of the vehicle body relative thereto are also known. This previously known construction was intended for the purpose of adjusting the axles to the curve of the track so as to avoid hunting and other undesirable action. This construction has been found to have the very undesirable action of being affected by lateral movements of the body frame relative to the bogie frame and axle frame such as body swaying or lurching whereby the axles were forcibly brought to improper angular position, and further undesired actions and reactions were set up.

The present invention has for an object to improve the guiding of the axles of a vehicle supported in the above described manner in such a way that relative movement of the vehicle body laterally does not affect the adjustment of the axles, whereby hunting and other undesired actions of the axles are eliminated.

In the accompanying drawing illustrating the invention:—

Figure 1:
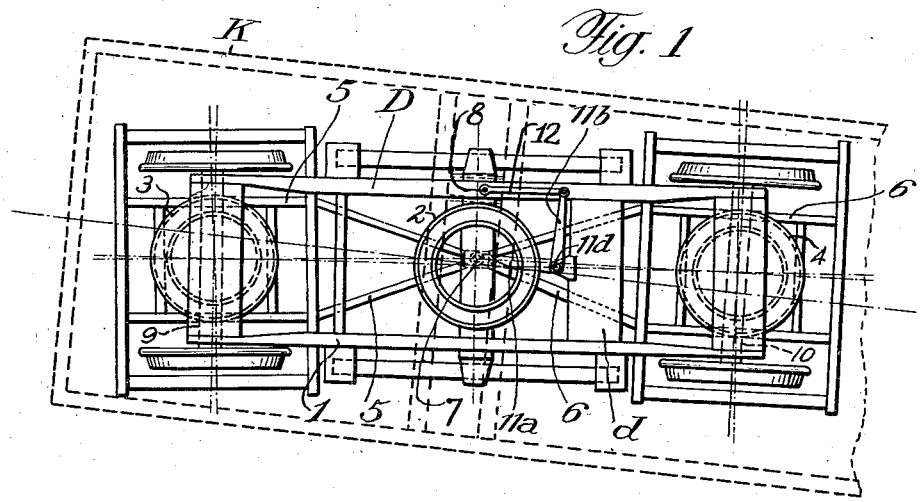
Fig. 1 shows in a plan view a construction of a bogie having two axles.

Referring now to the drawing in the constructional example illustrated in Fig. 1 K denotes the body of the rail-guided vehicle, which is provided in this case with two symmetrically arranged similar groups of axles built as bogies of the same type. Only one of the bogies is shown in Fig. 1 as the latter shows one end portion of the vehicle only, the other end portion is identical. Every bogie D is provided with a frame 1, on which the body K is supported by the main pivot pin 2. On the bogie frame the two vertical pivot pins 3 and 4 are arranged by means of which the bogie frame rests on the axle frames 5 and 6 and about which the axle frames swing. The two axle frames are connected together at 7 in an articulated manner which permits of longitudinal displacement. Laterally of the longitudinal axis of the body K and outside of the main pin 2 the guide point 8 formed by a pin is arranged and cooperates with the outer axle frame 5. In the axle frames 5 and 6 the axles 9 and 10 are mounted. The aforedescribed example illustrated in Fig. 1 is a bogie for a trailer vehicle having the same axle pressures on both axles.

One arm 11a of a bell-crank lever, turnably mounted in the longitudinal axis of the bogie frame on a cross member d of the bogie frame D, cooperates with the pin 7, whilst the other arm 11b of said lever extends at right angles to the arm 11a towards the side member of the bogie frame. The free end of the arm 11b is connected by a link 12 to the guide pin 8 of the vehicle body, which guide pin is arranged laterally of the main turning axis of the bogie.

In the above described arrangement the lateral oscillations of the vehicle which unavoidably occur when the vehicle runs over a straight track owing to the play of the springs cause a swinging motion of the link 12 about the lever arm 11b and only a turning motion of the vehicle body in a curve causes a longitudinal movement of the link 12 and thereby a turning of the bell crank lever 11 which positively causes the proper angular adjustment of the axle frames 5 and 6.

Figure 2:
Fig. 2 shows a detail of Fig. 1 in elevation.
Figure 3:
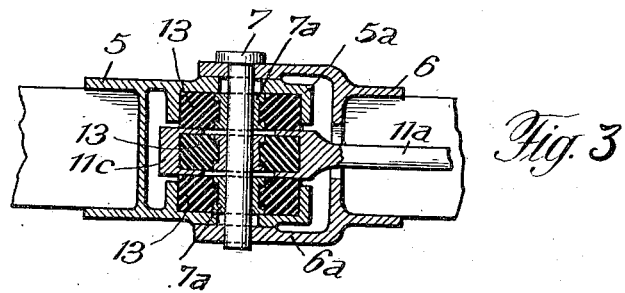
Fig. 3 shows on a larger scale and in a vertical section the connection point of the axle frames.
Figure 4:
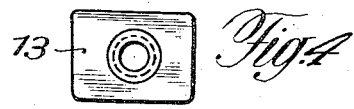
Fig. 4 shows a detail of Fig. 3 in a plan view.
Figure 1A:
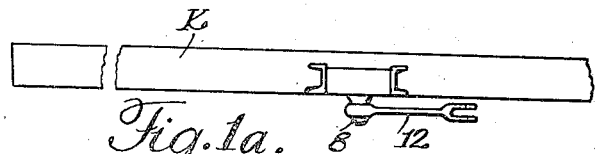
Fig. 1a is a side sectional view illustrating the connection between the body and a car axle frame control mechanism.

In Fig. 3 the construction of the connecting point of the two axle frames is illustrated. At the inner end of the frame 5 a casing 5a of a rectangular shape in a plan view is provided which is embraced by a fork shaped part 6a of the other axle frame 6 in which the pivot pin 7 is located, the elasticity of the rubber permitting the desired longitudinal displacement. In the casing 5a two rubber blocks 13 of rectangular prismatic shape are housed which hold the pin 7 by bearing bushes 7a. The end of the bell crank lever arm 11a is also shaped as a rectangular casing 11b in which a similar rubber block 13 is inserted. In a similar manner an elastic connection between the axle frame on the one hand and the bell crank lever 11 on the other hand is provided, in Fig. 2 only the pin 11d of this connection is indicated, the longer side of the rectangular rubber block extending in the longitudinal direction of the vehicle.

What I claim is:

1. A rail-guided vehicle, comprising in combination, a vehicle body structure, a bogie having a frame on which said body is pivotally supported, a pair of axles extending transversely of the longitudinal direction of the bogie frame, an axle frame for each of said axles mounted in said bogie frame and turnable about vertical axes, said bogie frame being supported by said axle frames at said vertical axes, articulated means for connecting said two axle frames to each other, said means being situated in the middle portion of the bogie frame, and means operatively connected to one of said axle frames for causing a displacement of said connecting means by relative longitudinal movement between the vehicle body and bogie on negotiating curves, whereby the axles are angularly adjusted, said connecting means allowing relative lateral movements between said body and bogie without affecting the angular positions of said axles.

2. A rail-guided vehicle, comprising in combination, a vehicle body structure, a bogie having a frame and a main pivot pin on which said body is supported on the bogie, a pair of axles extending transversely of the longitudinal direction of the bogie frame, an axle frame for each of said axles mounted in said bogie to be turnable about vertical axes, said bogie frame being supported by said axle frames at said vertical axes, articulated connection situated in the middle part of the bogie to connect said two axle frames to each other, and a guide pin arranged on the body structure removed from said main pivot pin of the body and operatively connected to one of said axle frames for causing a lateral displacement of said connecting means corresponding to the relative longitudinal movement between the vehicle body and the bogie on negotiating curves, said connecting means including a lost motion coupling permitting relative lateral movement between the body and bogie without affecting the position of said axle frames, whereby the axles are angularly adjusted to the curves.

3. A rail-guided vehicle, comprising in combination, a vehicle body structure, a bogie having a frame and a main pivot pin on which said body is supported on the bogie, a pair of axles, an axle frame for each axle mounted in said bogie to be turnable about vertical axes, said bogie frame being supported on said axle frames at said vertical axes, articulated means situated in the middle part of the bogie to articulately connect said two axle frames to each other, and a guide means on the body structure spaced from said main pivot pin of the body, means operatively connecting said guide means to one of said axle frames for displacing said connecting means corresponding to the relative longitudinal movement between the vehicle body and bogie on negotiating curves, said connection means including a lost motion device for eliminating the effect of relative lateral movements between the body and bogie, whereby the axles are angularly adjusted to the curves, said guide means taking no part in transmitting the load of the body to the bogie.

4. A rail-guided vehicle, comprising in combination, a vehicle body structure, a bogie having a frame and a main pivot pin on which said body is supported on the bogie, a pair of axles, an axle frame for each axle, vertical pivot pins provided in said bogie for mounting said axle frames turnably about vertical axes in said bogie, said bogie being supported on said axle frames at said vertical pivot pins, articulated means situated in the middle part of the bogie to articulately connect said two axle frames to each other, and a guide pin arranged on the body structure spaced from said main pivot pin of the body and operatively connected to one of said axle frames for displacing said connecting means corresponding to the relative longitudinal movement between the vehicle body and bogie on negotiating curves, whereby the axles are angularly adjusted to the curves, said means allowing relative lateral movements between the body and bogie without affecting the angular positions of the axles.

5. A rail-guided vehicle, comprising in combination, a vehicle body structure, a bogie having a frame and a main pivot pin on which said body is supported on the bogie, a group of two axles, an axle frame for each axle mounted in said bogie to be turnable about vertical axes, articulated means situated in the middle part of the bogie to articulately connect said two axle frames to each other, a guide pin arranged on the body structure spaced from said main pivot pin and laterally of the longitudinal axis of the vehicle, lever means and a connecting link interposed between said guide pin and said connecting means of the axle frames, said connecting link being so arranged that it takes up lateral oscillatory movements of the body structure without influencing the angular adjustment of the axles.

6. A rail-guided vehicle, comprising in combination, a vehicle body structure, a bogie having a frame and a main pivot pin on which said body is supported on the bogie, a group of two axles, an axle frame for each axle mounted in said bogie to be turnable about vertical axes, articulated means situated in the middle part of the bogie to articulately connect said two axle frames to each other, a guide pin arranged on the body structure spaced from said main pivot pin and laterally of the longitudinal axis of the vehicle, a bell crank lever turnably mounted about a vertical axis on said bogie frame, one arm of said bell crank lever extending in the longitudinal axis of the vehicle and cooperating with said means of connection of the axle frames, and a connecting link interposed between the other arm of said bell crank lever and said guide pin, said connecting link taking up lateral oscillatory movements of the body structure without influencing the angular adjustment of the axles.

7. A rail-guided vehicle, comprising in combination, a vehicle body structure, a bogie having a frame and a main pivot pin on which said body is supported on the bogie, a group of two axles, an axle frame for each axle mounted in said bogie to be turnable about vertical axes, articulated means situated in the middle part of the bogie to articulately connect said two axle frames to each other, a guide pin arranged on the body structure spaced from said main pivot pin and laterally of the longitudinal axis of the vehicle, a bell crank lever turnably mounted about a vertical axis on said bogie frame, one arm of said bell crank lever extending in the longitudinal axis of the vehicle and being directly connected to said means of connection of the axle frames, the other arm of said bell crank lever extending at right angles to the first arm, and a connecting link interposed between the other arm of said bell crank lever and said guide pin, said connecting link taking up lateral oscillatory movements of the body structure without influencing the angular adjustment of the axles.

8. A rail-guided vehicle, comprising in combination, a vehicle body structure, a bogie having a frame and a main pivot pin on which said body is supported on the bogie, a group of two axles, an axle frame for each axle mounted in said bogie to be turnable about vertical axes, articulated connecting means including a pin situated in the middle part of the bogie for connecting said two axle frames to each other, resilient insertions provided in said articulated connecting means, a guide pin arranged on the body structure spaced from said main pivot pin and laterally of the longitudinal axis of the vehicle, lever means and a connecting link interposed between said guide pin and said connecting means of the axle frames, said connecting link being so arranged that it takes up lateral oscillatory movements of the body structure without influencing the angular adjustment of the axles.

9. A rail-guided vehicle, comprising in combination, a vehicle body structure, a bogie having a frame and a main pivot pin on which said body is supported on the bogie, a group of two axles, an axle frame for each axle mounted in said bogie to be turnable about vertical axes, articulated connecting means including a pin situated in the middle part of the bogie for connecting said two axle frames to each other, rubber blocks having a rectangular cross section inserted in said articulated connecting means, a guide pin arranged on the body structure spaced from said main pivot pin and laterally of the longitudinal axis of the vehicle, lever means and a connecting link interposed between said guide pin and said connecting means of the axle frames, said connecting link being so arranged that it takes up lateral oscillatory movements of the body structure without influencing the angular adjustment of the axles.

10. A rail-guided vehicle, comprising in combination, a vehicle body structure, a bogie having a frame and a main pivot pin on which said body is supported on the bogie, a group of two axles, an axle frame for each axle mounted in said bogie to be turnable about a vertical axis, articulated connecting means including a pin situated in the middle part of the bogie for connecting said two axle frames to each other, rubber blocks having a rectangular cross section inserted in said articulated connecting means, a guide point arranged on the body structure outside of said main pivot pin and laterally of the longitudinal axis of the vehicle, a bell crank lever turnably mounted about a vertical axis on said bogie frame, one arm of said bell crank lever extending in the longitudinal axis of the vehicle and cooperating with said means of connection of the axle frames, and a connecting link interposed between the other arm of said bell crank lever and said guide pin, said connecting link taking up lateral oscillation movements of the body structure without influencing the radial adjustment of the axles, and a rubber block inserted in the connection between said bell crank lever and said connecting means.

MAX FREI.